United States Patent [19]

Hara et al.

[11] Patent Number: 4,506,857
[45] Date of Patent: Mar. 26, 1985

[54] ADJUSTABLE MOUNTING FOR A MOTOR ON A BASE

[75] Inventors: Takeo Hara, Inagi; Seiji Ito, Tokyo, both of Japan

[73] Assignee: Sony Corporation, Tokyo, Japan

[21] Appl. No.: 384,967

[22] Filed: Jun. 4, 1982

[30] Foreign Application Priority Data

Jun. 10, 1981 [JP] Japan .............................. 56-85428[U]

[51] Int. Cl.$^3$ ............................................. F16M 1/00
[52] U.S. Cl. .................................... 248/655; 248/652; 360/109
[58] Field of Search ............... 248/652, 655, 656, 662; 360/109, 104, 84, 86; 310/91

[56] References Cited

U.S. PATENT DOCUMENTS

| 2,905,933 | 9/1959 | Canepa | 360/109 X |
| 2,997,547 | 8/1961 | Beachell | 360/109 |
| 3,310,791 | 3/1967 | Fischer | 360/109 |
| 3,900,888 | 8/1975 | Uchikoshi | 360/109 X |
| 4,319,293 | 3/1982 | Tomabechi | 360/109 X |
| 4,442,367 | 4/1984 | Suzuki | 310/91 |

FOREIGN PATENT DOCUMENTS

| 828014 | 1/1952 | Fed. Rep. of Germany | 360/109 |
| 759408 | 10/1956 | United Kingdom | 360/109 |
| 456299 | 3/1975 | U.S.S.R. | 360/109 |

Primary Examiner—J. Franklin Foss
Attorney, Agent, or Firm—Lewis H. Eslinger; Alvin Sinderbrand

[57] ABSTRACT

A motor having a motor casing rotatably supporting a motor shaft is mounted in respect to a base so as to permit adjustment of the angular relation of the axis of the motor shaft in respect to the base by providing first and second spaced apart fulcrum-defining abutments extending from the motor casing and engageable with the base along a first straight line which is spaced from the axis of the motor shaft, coil springs urging the fulcrum-defining abutments against the base so that the motor casing and shaft are angularly displaceable about the first straight line in respect to the base, a leaf spring disposed between the motor casing and base and having an angled portion for urging the motor casing and shaft angularly relative to the base in one direction, a pin with a threaded bore extending from the motor casing at a location which is spaced, in a direction opposite to the first straight line, from a second straight line passing through the axis of the motor shaft parallel to the first straight line, and an adjusting screw received in the threaded bore and engaging the base for adjustably determining the angular position relative to the base to which the motor casing and shaft are urged by the leaf spring.

15 Claims, 10 Drawing Figures

ADJUSTABLE MOUNTING FOR A MOTOR ON A BASE

BACKGROUND OF THE INVENTION

1. Field of the Invention

This invention relates generally to the adjustable mounting of a motor in respect to a base therefor, and more particularly is directed to the adjustable mounting on a base of a motor whose shaft functions as a capstan in a direct drive type VTR, audio tape recorder or the like.

2. Description of the Prior Art

In a VTR (video tape recording and/or reproducing apparatus) or audio tape recorder, if the axis of the capstan for driving the tape is inclined from the direction extending transversely or at right angles in respect to the longitudinal medium or path of the tape pressed against the capstan by a pinch roller, the tape may undergo relative elongation at one longitudinal edge portion or the other, or the tape may even be displaced from between the capstan and pinch roller. Even if such extreme problems do not occur, smooth movement of the tape will not be attained and, therefore, it is necessary to adjustably position the capstan so that its axis is perpendicular to the longitudinal medium of the tape or to the direction of the path along which the tape is being driven.

In a direct drive VTR or audio tape recorder, the shaft of the driving motor forms the capstan and is rotatably supported in a bearing structure which is usually formed integral with the motor casing. In such a case, adjustment of the capstan axis so as to be precisely perpendicular to the longitudinal medium of the tape being driven thereby is conventionally achieved by providing one or more suitably dimensioned shims or spacers between a peripheral flange on the motor casing and a base of the VTR or audio tape recorder at the time when the motor is being secured in the apparatus, as by screws extending through the flange into the mounting base. Obviously, such adjustment of the relation of the capstan axis to the path of the tape is difficult and time consuming, and, at best, provides a step-by-step, rather than a continuous adjustment. Further, if the flange of the motor casing is positioned above the motor mounting base so that the shims or spacers can be inserted or interchanged relatively easily when effecting the adjustment, the area of the upper surface of the mounting base occupied by the motor is relatively large and, therefore, limits the area of the upper surface of the base that remains available for the mounting of other components thereon. On the other hand, if the peripheral flange of the motor casing is applied against the underside of the mounting base so that the upper surface of the latter is largely available for the mounting of other components thereon, the selective insertion of one or more shims or spacers between the underside of the mounting base and the flange on the motor casing can be realized only with great difficulty, with the result that any adjustment of the axis of the capstan in respect to the tape path is time consuming and expensive to effect.

It has been further conceived to provide a motor for the direct drive of a capstan in a VTR or audio tape recorder in which the bearing housing for the motor shaft or capstan is separate from the remainder of the motor casing. In such case, a peripheral flange of the motor casing is secured directly against the underside of the mounting base, while a flange on the separately formed bearing housing for the motor shaft or capstan which extends over a relatively smaller area is secured to the upper surface of the mounting base and is angularly adjusted relative to the latter by one or more shims or spacers therebetween so as to effect the desired angular relation of the capstan axis in respect to the path of the tape to be driven thereby. However, this last described arrangement is disadvantageous in that adjustment of the capstan axis is accompanied by variations in the relative positioning of the rotor and stator of the motor with the result that uniform motor characteristics cannot be guaranteed.

OBJECTS AND SUMMARY OF THE INVENTION

Accordingly, it is an object of the present invention to provide for the mounting of a motor on a base in a manner to permit the adjustment of the angular relation of the axis of the motor shaft in respect to the base, and which avoids the previously mentioned disadvantages of the prior art.

More specifically, it is an object of this invention to provide a device for mounting a motor on a base so as to permit the easy and continuous fine adjustment of the angular relation of the axis of the motor shaft in respect to the base by means of a rotatable adjusting screw.

Another object of the invention is to provide a device for mounting a motor on a base, as aforesaid, which permits mounting of the motor on the base and adjustment of the angular relation of the motor shaft in respect to the base to be automatically effected.

In accordance with an aspect of this invention, a device for mounting a motor on a base so as to permit adjustment of the angular relation of the axis of the motor shaft in respect to the base comprises fulcrum-defining means extending from the casing of the motor and being engageable with the base along a first straight line which is spaced from the axis of the motor shaft, means for urging the fulcrum-defining means against the base so that the motor casing and shaft are angularly displaceable about the first straight line in respect to the base, yieldable means for urging the motor casing and shaft angularly relative to the base in one direction about the first straight line, threaded means on the motor casing at a location which is spaced, in a direction opposite to the first straight line, from a second straight line passing through the motor axis parallel to the first straight line, and an adjusting screw received by the threaded means and engaging the base for adjustably determining the angular position to which the motor casing and shaft are urged relative to the base by the yieldable means.

The above, and other objects, features and advantages of the invention, will be apparent in the following detailed description of illustrative embodiments of the invention which is to be read in connection with the accompanying drawings.

DETAILED DESCRIPTION OF THE PREFERRED EMBODIMENTS

Figure 1:
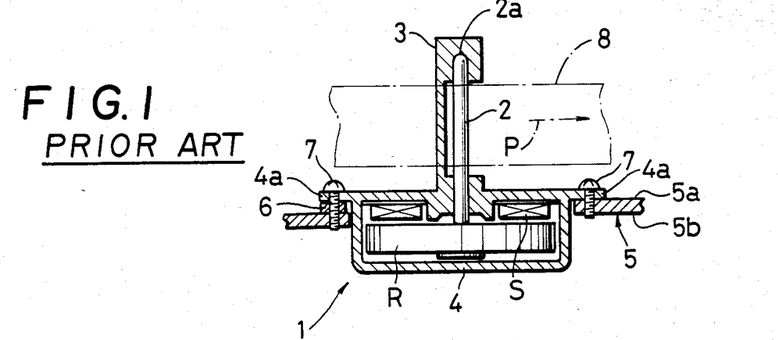
FIG. 1 is a vertical sectional view of a brushless DC motor whose shaft constitutes a directly driven capstan and showing one arrangement according to the prior art for mounting the motor on a base so as to permit adjustment of the angular relation of the capstan axis in respect to the direction along the path of the tape being driven by the capstan.

Before proceeding with a detailed description of the invention, specific reference will be made to arrangements employed in the prior art for adjustably mounting a motor so that its shaft, which forms a directly driven capstan, can have its axis disposed at right angles to the direction along the path in which the tape is driven, and from which the problems resolved by the invention will be readily apparent. Referring initially to FIG. 1, it will be seen therefrom that a motor 1, for example, a brushless DC motor, generally includes a stator S and a rotor R from which there extends a motor shaft 2 forming a capstan and being rotatably supported, at its portion adjacent rotor R and also at its upper end 2a, in a bearing housing 3 which is integral with a casing 4 of the motor. Motor casing 4 is shown to be formed with a peripheral flange 4a for mounting the motor on a base 5 which, as shown, may be in the form of a base plate having substantially parallel upper and lower surfaces 5a and 5b. In securing flange 4a to base plate 5, one or more shims or spacers 6 of suitable thickness are selectively disposed therebetween prior to the rigid attachment of flange 4a to base plate 5 by means of screws 7. It will be seen that, by selecting the number or thickness of the shims or spacers 6 and the locations thereof between flange 4a and base plate 5, the angular relation of the axis of shaft or capstan 2 in respect to base plate 5 can be adjusted to ensure that the axis of capstan 2 is perpendicular or at right angles to the direction P along the path of the tape 8 being driven by the capstan.

Since changing the angular relation of the axis of shaft or capstan 2 in respect to base plate 5 requires either changing the number of the spacers or shims 6 or changing the thickness of the latter, such adjustment is obviously time consuming and is performed step-by-step, rather than in a continuous manner, so that it is difficult to achieve exact perpendicularity of the axis of capstan 2 in respect to the direction P along the driven tape.

Further, in the arrangement shown in FIG. 1, the peripheral flange 4a of motor casing 4 overlies the upper surface 5a of base plate 5 so that the insertion or interchange of shims or spacers 6 between flange 4a and base plate 5 for adjusting the angle of the axis of capstan 2 can be effected relatively easily. However, the arrangement shown on FIG. 1 is disadvantageous in that the area of the upper surface 5a of base plate 5 occupied by the motor 1 is determined by the relatively large extent of flange 4a extending from the periphery of motor casing 4, thereby substantially reducing the area available on the upper surface 5a of the base plate for the mounting of other components. On the other hand, if resort is had to the arrangement shown on FIG. 2 and in which motor 1 is mounted with flange 4a of its casing 4 disposed against the lower surface or underside 5b of base plate 5, only the bearing housing 3 extends above upper surface 5a of the base plate so that such upper surface 5a is largely unobstructed by motor 1 and can be effectively used for the mounting of other components thereon. However, when flange 4a of motor casing 4 is disposed against the underside 5b of base plate 5, as in FIG. 2, the mounting of the motor becomes a very complex and difficult operation which cannot be efficiently performed in that it is necessary to interpose one or more of the spaces or shims 6 between flange 4a and base plate 5 at the underside of the latter to which access cannot be readily had when seeking to adjust the angular relation of the axis of capstan 2 in respect to the direction P along the tape being driven.

Figure 2:
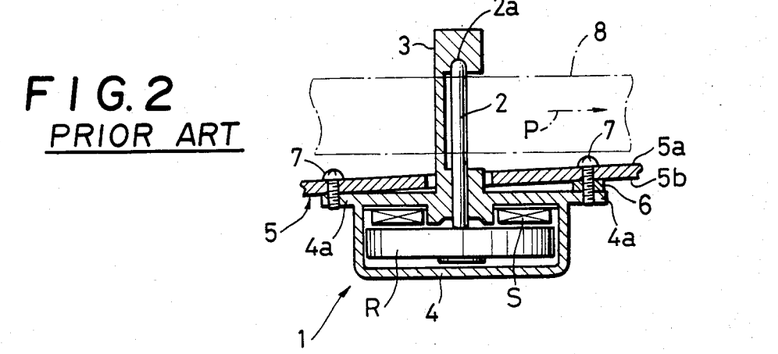
FIG. 2 is a view similar to that of FIG. 1, but showing another arrangement by which it has been proposed to adjustably mount the motor in accordance with the prior art.
Figure 3:
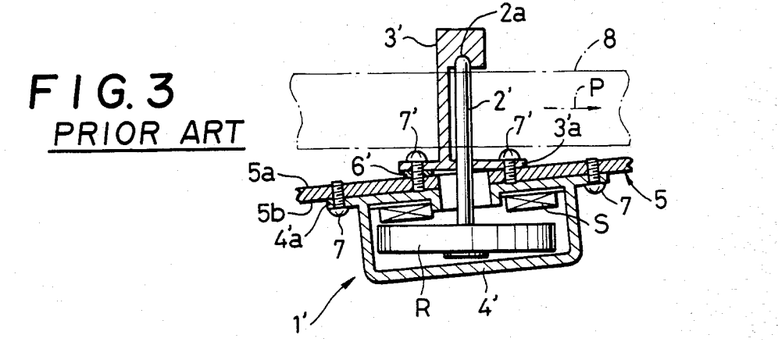
FIG. 3 is another vertical sectional view similar to that of FIG. 1, but showing another arrangement of the prior art for adjusting the angular relation of the capstan axis to the direction along the tape path.
Figure 4:
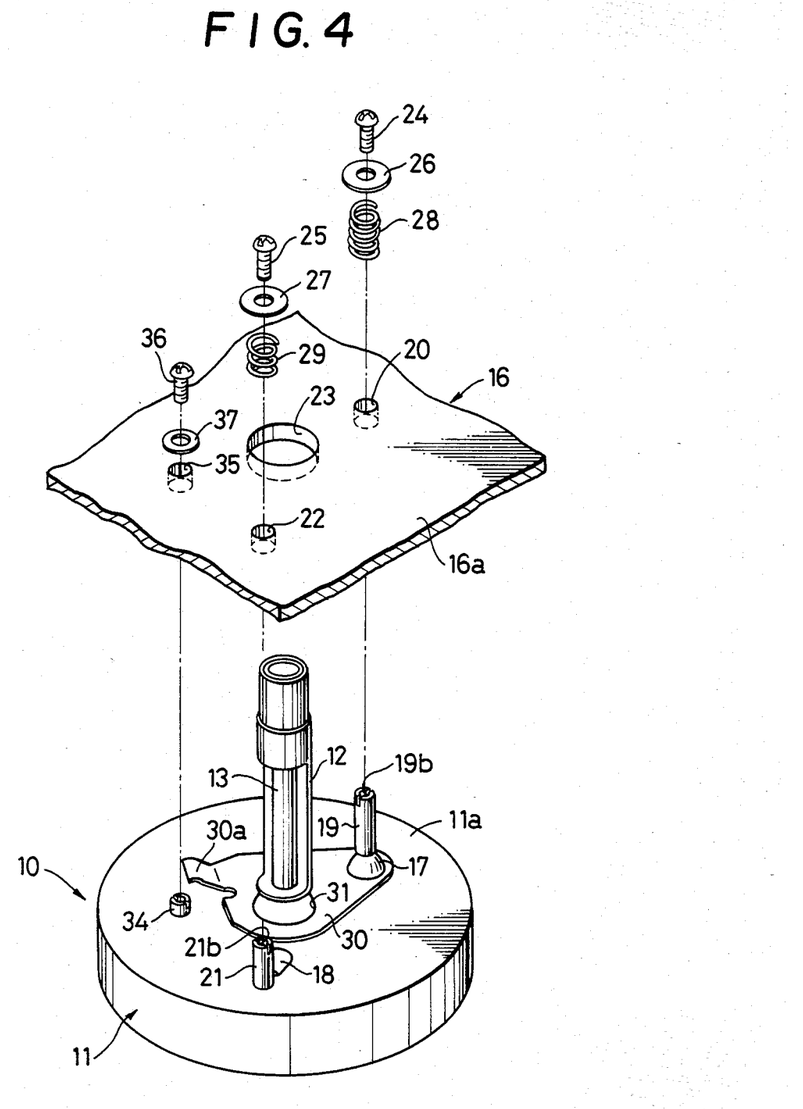
FIG. 4 is an exploded perspective view of an embodiment of the present invention applied to the mounting and adjustment of a motor whose shaft forms a capstan in a direct drive type VTR.

In order to avoid the above described disadvantages of the arrangements shown on FIGS. 1 and 2, it has been conceived, as shown on FIG. 3, to rotatably support the motor shaft or capstan 2′ of a brushless DC motor in a bearing housing 3′ which is formed separately from the motor casing 4′, and which has a mounting flange 3′a at the lower end of bearing housing 3′ extending over an area that is relatively small when compared with the extent of the peripheral flange 4′a on motor casing 4′ of motor 1′. By reason of the separation of bearing housing 3′ from motor casing 4′, flange 4′a of motor casing 4′ is secured by screws 7 directly to the underside 5b of base plate 5 without any shims or spacers interposed therebetween, and flange 3′a is secured to the upper surface 5a of base plate 5, as by screws 7′, but with one or more shims or spacers 6′ of selected thickness being interposed between flange 3′a and the upper surface 5a of base plate 5 to achieve the desired right angular relationship of the axis of capstan 2′ in respect to the direction P along the driven tape path. Since the shims or spacers 6′ are inserted between flange 3′a and the upper surface 5a of base plate 5 to which there is ready access, the insertion of the shims or spacers 6′ is more easily effected than in the arrangement of FIG. 2. Further, flange 3′a on the upper surface of base plate 5 does not occupy a large area thereof so that the remaining major portion of upper surface 5a continues to be available for the mounting thereon of other components.

However, in the prior art arrangement of FIG. 3, the final assembly of motor 1′ occurs only at the time of its mounting on base plate 5 and the adjustment of the angular relation of the axis of shaft 2′ in respect to base plate 5 is accompanied by variations in the relative positioning of the rotor R and stator S of the motor with the result that uniform characteristics of the motor cannot be guaranteed. Moreover, in the case of the prior art arrangement shown on FIG. 3, as well as in the case of the arrangements shown on FIGS. 1 and 2, the automated assembling, mounting and adjusting of motor 1 or 1' in respect to base plate 5 is very difficult to achieve in that selective insertion of one or more of the shims or spacers 6 for achieving a necessary correction in the angular relation of the shaft axis relative to base plate 5 is not susceptible to automated procedures.

Referring now to FIGS. 4-7, it will be seen that a motor 10 provided with a mounting device according to an embodiment of this invention generally comprises a motor casing 11 having an integral bearing housing 12 extending perpendicularly from the center of a top wall 11a of casing 11. A motor shaft 13, which forms a directly driven capstan, is rotatably journaled, at its upper end 13a and at a portion adjacent the lower end of shaft 13, in bearing housing 12. The lower end of shaft 13 is press-fitted or otherwise fixed to a central hub of a rotor magnet 14 (FIGS. 6 and 7) which is magnetized to provide alternately opposite polarities at successive locations spaced apart equally in the circumferential direction. A plurality of stator coils 15 are bonded or otherwise fixed to the underside of upper wall 11a of motor casing 11 in a circular array about shaft 13, so that stator coils 15 and magnet 14 are in opposed relation with a small gap therebetween. Rotor magnet 14 and shaft 13 are urged upward relative to motor casing 11 by a magnetic attraction established between rotor magnet 14 and a stator yoke (not shown) which is desirably associated with stator coils 15 so that the upper end 13a of shaft 13 is urged against an axial bearing surface formed in the head portion of housing 12 for receiving the thrust load.

Figure 5:
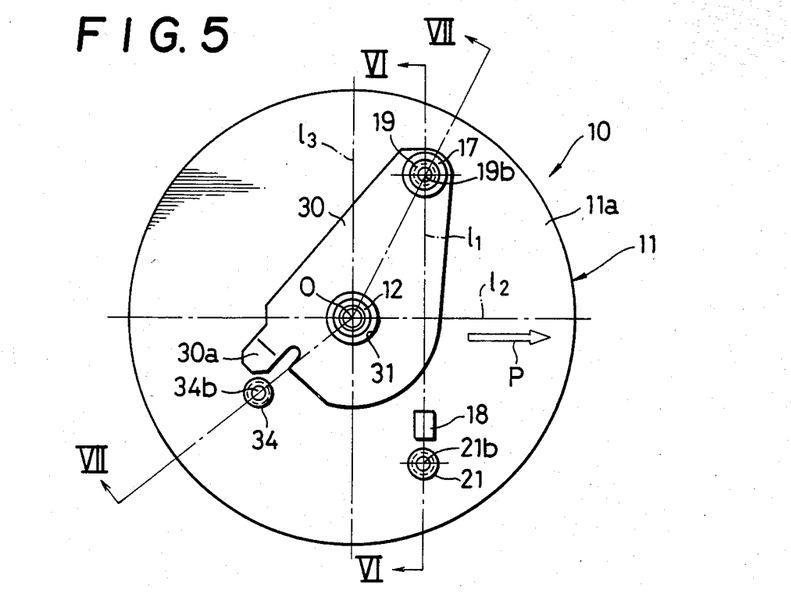
FIG. 5 is a top plan view of the motor directly driving the capstan or shaft and of the elements of FIG. 4 provided on the motor casing for adjustably mounting the same in respect to a base.

In accordance with the present invention, a device for mounting the above-described motor 10 on a base 16 in the form of a plate so as to permit adjustment of the angular relation of the axis of motor shaft 13 in respect to base plate 16 comprises fulcrum-defining means constituted by abutments 17 and 18 extending from the upper wall 11a of motor casing 11 and being engageable with the underside or lower surface 16b of base plate 16 (FIG. 6) along a first straight line $l_1$ (FIG. 5). Such line $l_1$ is spaced from the axis O of motor shaft 13 in the direction in which the tape is driven or propelled by capstan shaft 13 and which extends at right angles to the plane containing the path P of the driven tape 8. The fulcrum-defining abutments 17 and 18 are further shown to be spaced apart along straight line $l_1$ so as to be at opposite sides of a line $l_2$ which extends through the shaft axis O at right angles to line $l_1$. Each of abutments 17 and 18 has a surface with a cross-sectional configuration, in a plane normal to line $l_1$, which has substantially point contact with the lower surface 16b of base plate 16. Thus, for example, abutment 17 may be constituted by an approximately hemispherical surface on a skirt formed integrally on the lower end portion of a pin 19 which has a threaded lower end extension 19a (FIGS. 6 and 7) screwed into a tapped hole in the upper wall 11a of motor casing 11 so that the axis of pin 19 will lie on line $l_1$. Base plate 16 has a circular opening 20 (FIGS. 4, 6 and 7) extending therethrough and being diametrically dimensioned so as to be larger than the diameter of pin 19 and intermediate the largest and smallest diameters of the hemispherical surface of abutment 17 at the lower end of pin 19. Thus, pin 19 can extend fully in opening 20 and the edge of such opening, at the lower surface 16b of base plate 16, which edge is desirably chamfered, is engageable with the hemispherical surface of abutment 17.

The other abutment 18 may be in the form of a semi-cylindrical projection extending from the upper surface of upper wall 11a of motor casing 11, and being formed integral with the latter so that the axis of such semi-cylindrical projection coincides with the line $l_1$. By reason of the described configurations of abutments 17 and 18, motor casing 11 and shaft 13 in bearing housing 12 are angularly displaceable substantially about line $l_1$ in respect to base plate 16 when abutments 17 and 18 are urged against the lower surface 16b of the base plate.

For urging abutments 17 and 18 against surface 16b of the base plate, another pin 21 is provided with a threaded extension 21a at its lower end screwed into a tapped hole formed in the upper wall 11a of the motor housing so that the axis of pin 21 lies on a continuation of line $l_1$ adjacent to abutment 18. Pin 21 extends upwardly from wall 11a of the motor casing through a suitably located opening 22 in base plate 16 which, of course, also has a suitably located opening 23 through which bearing housing 12 and shaft 13 may extend upwardly. Pins 19 and 21 have upwardly opening threaded bores 19b and 21b (FIG. 4) for receiving screws 24 and 25 by which washers 26 and 27 are respectively secured on the upper ends of pins 19 and 21 to act as spring anchors for helical coil springs 28 and 29, respectively. Such coil springs 28 and 29 are compressed between the upper surface 16a of base plate 16 and spring anchors 26 and 27 so as to urge the fulcrum-defining abutments 17 and 18 against lower surface 16b of the base plate with the result that motor casing 11 and shaft 13 within bearing housing 12 are angularly displaceable about line $l_1$ in respect to base plate 16.

A leaf spring member 30 having a relatively large spring constant is formed with a relatively large substantially centrally located opening 31 through which bearing housing 12 extends. Leaf spring member 30 is clamped, at one end, on top of top wall 11a of motor casing 11 by pin 19 which has its threaded lower extension 19a passed through a corresponding opening in an end portion of leaf spring member 30. Leaf spring member 30 is further formed with a normally angled portion 30a which extends upwardly from the normally flat remaining portion of spring member 30 bearing on upper wall 11a of motor casing 11 so as to engage angled portion 30a with the lower surface 16b of base plate 16. As is shown particularly on FIG. 5, spring 30 is shaped so that its angled portion 30a is spaced, in a direction opposite to line $l_1$, from a straight line $l_3$ passing through the axis O of shaft 13 parallel to line $l_1$. Thus, angled portion 30a of leaf spring member 30, in acting against the lower surface 16b of base plate 16, urges motor casing 11 and shaft 13 to move angularly relative to base plate 16 about straight line $l_1$ in the direction of the arrows 32 and 33, respectively, on FIG. 7.

For adjustably determining the angular position to which motor casing 11 and shaft 13 are urged relative to base plate 16 by means of leaf spring member 30, the mounting device for motor 10 according to this invention is further shown to include a pin 34 having a threaded extension 34a at its lower end received in a tapped hole in top wall 11a of motor casing 11 and being located adjacent angled portion 30a of leaf spring member 30. Thus, pin 34 is also disposed at a location on motor casing 11 which is spaced, in the direction opposite to straight line $l_1$, from the straight line $l_3$ passing through the axis O of shaft 13 parallel to straight line $l_1$. Pin 34 is loosely received in a suitably located hole 35 in base plate 16, and pin 34 is formed with a threaded bore 34b (FIG. 5) for receiving an adjusting screw 36 extending through a washer 37 of larger diameter than hole 35 so as to bear upon upper surface 16a of base plate 16.

The above described arrangement according to this invention for mounting the motor 10 and capstan or shaft 13 in respect to base plate 16 operates as follows.

Figure 7:
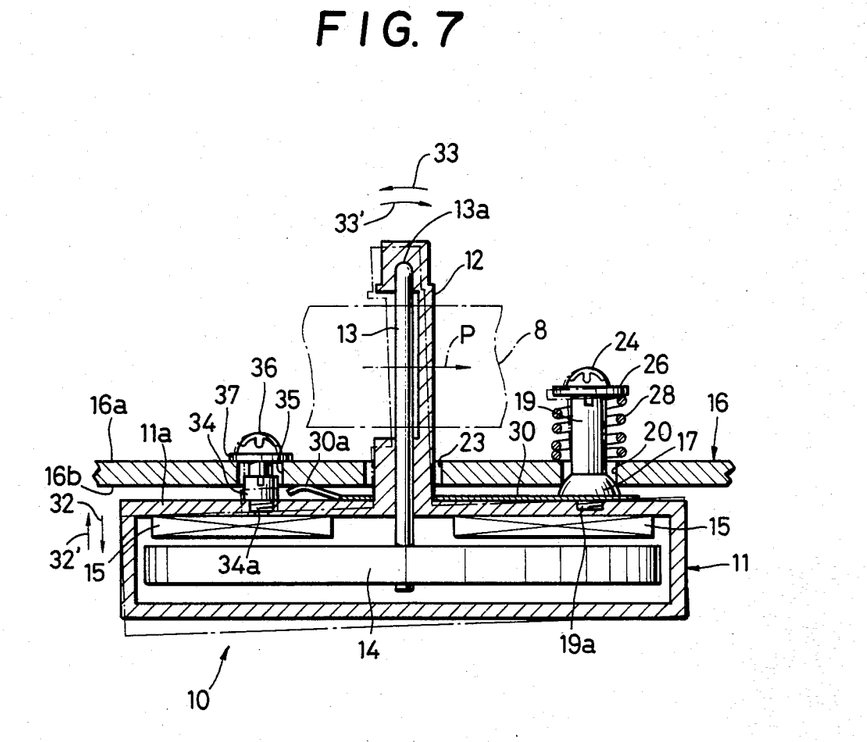
FIG. 7 is an enlarged vertical sectional view taken along the line VIII—VIII on FIG. 5.

When adjusting screw 36 is turned in the tightening direction, that is, in the direction which increases the penetration of screw 36 into pin 34, the engagement of washer 37 under the head of screw 36 with upper surface 16a of base plate 16 causes pin 34 to be drawn upwardly into hole 35 in the direction of the arrow 32' on FIG. 7. Thus, top wall 11a of motor casing 11, in the region near pin 34, is moved toward base plate 16 against the resilience of the angled portion 30a of leaf spring member 30, and capstan or shaft 13 is pivotally or angularly moved in the direction of the arrow 33' on FIG. 7 about straight line $l_1$ (FIG. 5). During such angular movement of capstan or shaft 13 with respect to base plate 16, the engagement of abutment 17 with the lower edge of hole 20 in base plate 16 and the engagement of abutment 18 with lower surface 16b of the base plate is maintained by compression springs 28 and 29, so that the angular movement of the axis of shaft 13 occurs in a plane which is parallel with the plane of the tape 8 being driven by shaft or capstan 13.

When adjusting screw 36 is turned in the opposite direction, that is, in the direction for increasing the extension of screw 36 out of the tapped bore in pin 34, the latter is urged in the direction of arrow 32 on FIG. 7 by the force of angled portion 30a of leaf spring member 30 so that shaft or capstan 13 is pivoted in the direction of the arrow 33 on FIG. 7 about straight line $l_1$ (FIG. 5) while the axis of shaft 13 is maintained in the plane parallel to the plane of the driven tape.

From the above, it will be apparent that the height of capstan or shaft 13 in respect to the run of the tape 8 to be driven thereby and the disposition of the axis of shaft 13 in a plane parallel to the plane of the surface of the tape to be engaged by the shaft or capstan are at all times determined by engagement of abutment 17 on pin 19 and abutment 18 on motor casing 11 with base plate 16. Further, adjustment of the angular relation of the axis of shaft 13 to base plate 16, and hence relative to the longitudinal median or direction of the tape being driven is effected merely by suitable turning of adjusting screw 36. It will be clear that the adjustment effected by turning of screw 36 can be a continuous fine adjustment by which the axis of shaft 13 can be disposed precisely at right angles to the longitudinal median of the tape being driven. Further, since motor casing 11 is arranged at the underside of base plate 16 and is held to the latter by devices, for example, springs 28 and 29 and adjusting screw 36, arranged within the perimeter of motor casing 11, the upper surface of base plate 16 is still largely available for the mounting thereon of other components.

Figure 8:
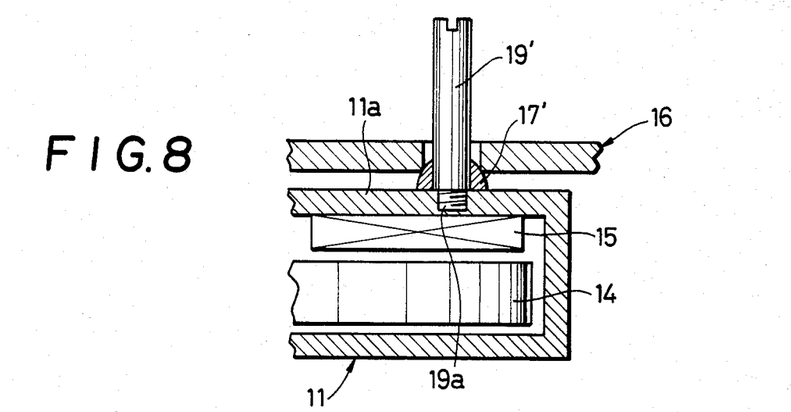
FIG. 8 is a fragmentary enlarged sectional view showing a modification of one of the fulcrum-defining abutments provided on the motor casing and about which the latter is adjustable relative to the mounting base in accordance with the invention.

In the embodiment of the invention described above with reference to FIGS. 4–7, abutment 17 has been provided by a skirt-like projection extending integrally from the lower end portion of pin 19. However, as shown on FIG. 8, the corresponding pin 19' and abutment 17' may be formed separately from each other, with the abutment 17' then being fitted over pin 19' and suitably bonded or fixed thereto.

Figure 6:
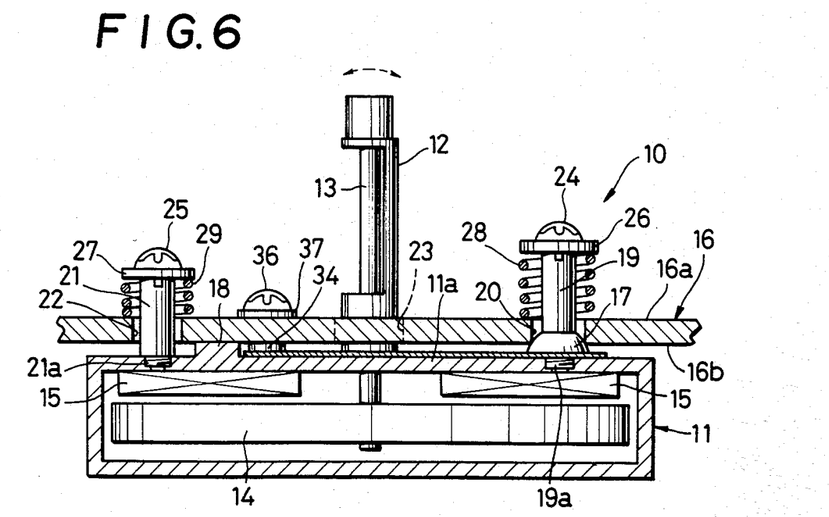
FIG. 6 is an enlarged vertical sectional view taken along the line VI—VI on FIG. 5, and showing the mounting of the motor on a base in accordance with the present invention.

Further, in FIG. 6, abutment 18 is illustrated as being constituted by an integral projection extending from the upper surface of top wall 11a of motor casing 11. However, as shown on FIG. 9, a similarly shaped abutment 18' may be formed separate from motor casing 11' and then suitably bonded or fixed to the top wall 11a of the motor casing.

Figure 9:
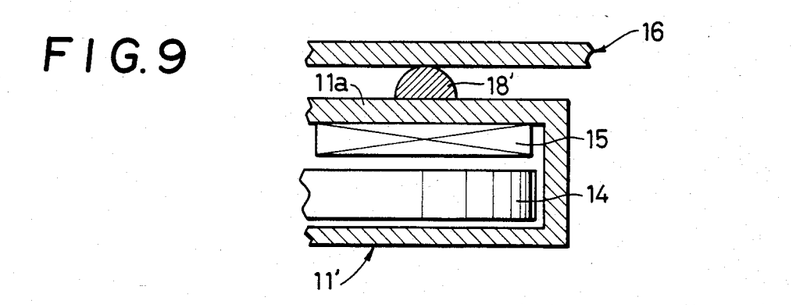
FIGS. 9 and 10 are enlarged fragmentary sectional views showing respective modifications of another of the fulcrum-defining abutments provided in accordance with the invention.
Figure 10:
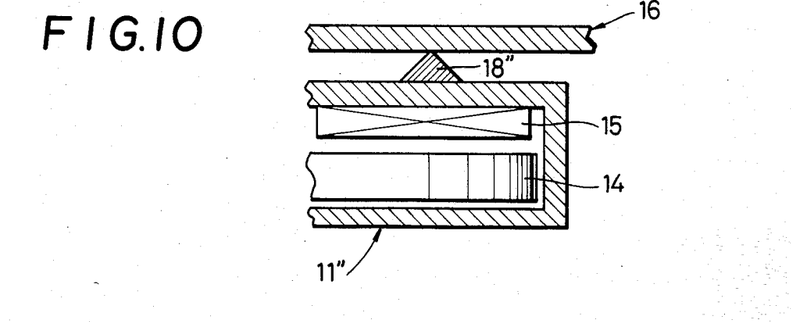

Moreover, it is not necessary that abutment 18 or 18' have a semi-circular cross-section in a plane at right angles to line $l_1$, for example as specifically shown on FIG. 9 in respect to abutment 18'. Thus, as shown on FIG. 10, the corresponding abutment 18" may be of triangular cross-section for similarly defining the fulcrum about which the respective motor casing 11" can pivot relative to base plate 16. The abutment 18" may be in the form of a triangular prism, so as to have contact with the undersurface of base plate 16 along a line corresponding to the line $l_1$ of FIG. 5, or such abutment 18" may be in the form of a triangular pyramid so as to engage base plate 16 substantially at a point lying on line $l_1$. Furthermore, abutments 17 and 18 may be mounted on top wall 11a of motor casing 11a as shown, or such abutments may be mounted on a separate plate member (not shown) which is, in turn, fixed to the upper surface of top wall 11a of the motor casing.

It is also to be appreciated that the position of pin 34 receiving adjusting screw 36 may be varied from that shown on FIG. 5 so long as such pin 34 and adjusting screw 36 are located at the upstream side of the line $l_3$ with respect to the direction in which the tape is driven by shaft or capstan 13.

It is also to be appreciated that the present invention is applicable to the adjustable mounting of directly driven capstans in VTRs and audio tape recorders, as well as to various other devices in which it is desirable or necessary to adjust the angular relation of a motor shaft in respect to a mounting base.

Since the adjustable mounting of motor 10 relative to base plate 16 in accordance with this invention does not require the insertion of any shims or spacers, as at 6 or 6' in the prior art of FIGS. 1–3, and a continuous fine adjustment is achieved merely by suitably turning screw 36, the mounting of the motor and the adjustment of its shaft can be effected automatically in a suitable assembly apparatus, whereby to substantially improve the speed of assembly and reduce the cost thereof.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In combination with a motor for driving a tape along a predetermined path, said motor having a motor casing rotatably supporting a tape-driving motor shaft, and a plate-like base fixed relative to said path and having an opening therein: a device for mounting said motor on said base with said motor casing disposed beneath said base and said motor shaft extending upwardly and generally perpendicularly to said base through said opening therein so as to permit adjustment of the angular relation of the axis of said motor shaft in respect to said base, comprising fulcrum-defining means extending from said motor casing and engageable with said base along a first straight line which is spaced from said axis of the motor shaft;

means for urging said fulcrum-defining means against said base so that said motor casing and shaft are angularly displaceable about said first straight line in respect to said base;

yieldable means for urging said motor casing and shaft angularly relative to said base in one direction about said first straight line;

threaded means on said motor casing at a location which is spaced, in a direction opposite to said first straight line, from a second straight line passing through said axis parallel to said first straight line and also spaced from said path; and an adjusting screw received by said threaded means and engaging said base for adjustably determining the angular position to which said motor casing and shaft are urged relative to said base by said yieldable means.

2. The combination according to claim 1; in which said fulcrum-defining means includes first and second abutments spaced apart along said first straight line for engagement with said base and being at opposite sides of a third line extending through said axis at right angles to said first straight line.

3. The combination according to claim 2; wherein each of said abutments has a surface with a cross-sectional configuration, in a plane normal to said first straight line, which has substantially point contact with said base.

4. The combination according to claim 3; in which said cross-sectional configuration is substantially semi-circular.

5. The combination according to claim 3; in which said cross-sectional configuration is substantially triangular.

6. The combination according to claim 2; in which said motor shaft is a capstan for driving said tape along said path, and said third line is parallel to said path of the tape.

7. The combination according to claim 2; in which said first and second abutments and said yieldable means engage the undersurface of said plate-like base; said plate has additional openings therein through which extend said means for urging the fulcrum-defining means against said base, and said adjusting screw; and said means for urging the fulcrum-defining means and said adjusting screw act against the upper surface of said plate-like base.

8. The combination according to claim 7; in which said means for urging the fulcrum-defining means against said base includes first and second pins extending from said motor casing through said openings of the plate and having respective axes intersecting said first straight line and being spaced apart along the latter at opposite sides of said third line, spring anchors at the ends of said first and second pins remote from said motor casing, and first and second coil springs on said first and second pins, respectively, and being compressed between said spring anchors and said upper surface of the plate.

9. The combination according to claim 8; in which one of said first and second pins is spaced along said first straight line from each of said first and second abutments.

10. The combination according to claim 8; in which one of said abutments is located at a base portion of a respective one of said first and second pins.

11. The combination according to claim 10; in which said one abutment has a hemispherical surface to contact an edge of said undersurface of the plate at the opening through which said respective one of the pins extends.

12. The combination according to claim 8; in which each of said pins has a threaded bore opening at its upper end, and each of said opening anchors includes a washer secured at the upper end of the respective one of said pins by a screw engaged in the respective threaded bore.

13. The combination according to claim 12; in which said threaded means includes a third pin extending from said motor casing into one of said openings of said plate and having a threaded bore, and said adjusting screw engages in said threaded bore of the third pin.

14. The combination according to claim 7; in which said yieldable means includes a leaf spring member disposed between said undersurface of the base plate and said motor casing and including a substantially flat portion and a normally angled portion tending to space said motor casing from said base plate and thereby urging said motor casing and shaft angularly in said one direction.

15. The combination according to claim 14; in which said angled portion of the leaf spring is located adjacent said threaded means.

* * * * *